Nov. 3, 1953 L. B. NEIGHBOUR 2,657,583
MANURE SPREADER DRIVE MECHANISM
Filed Aug. 23, 1951 2 Sheets-Sheet 1
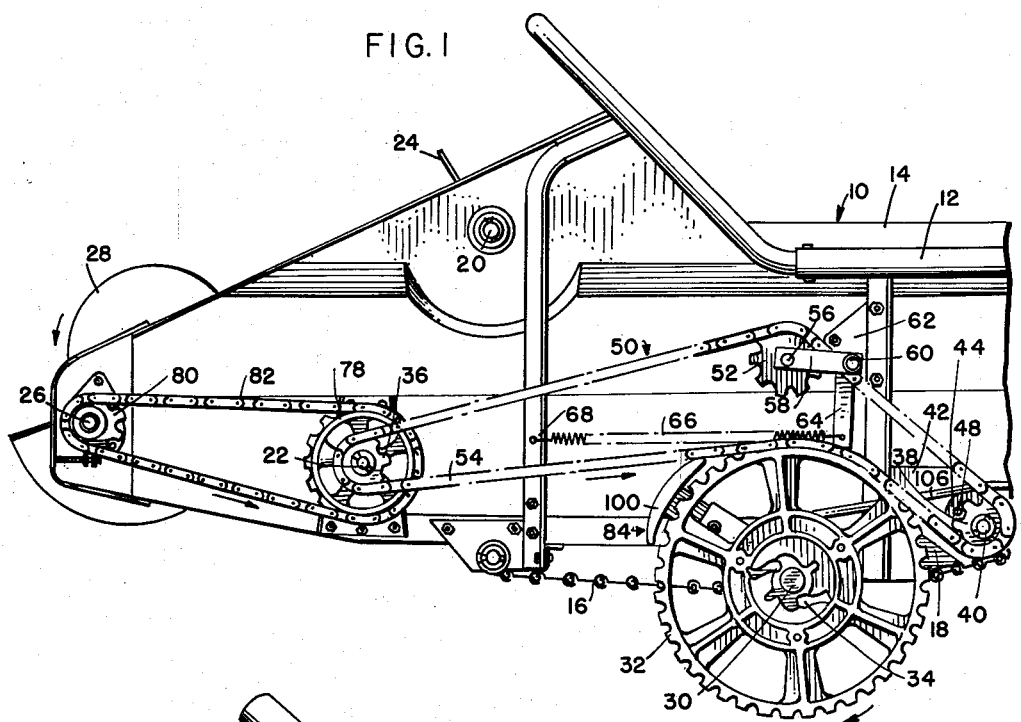
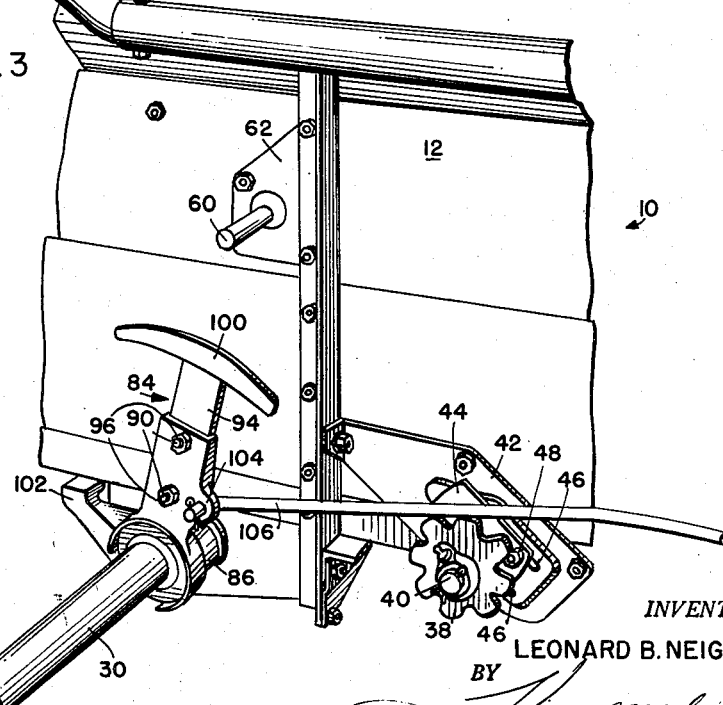
INVENTOR:
LEONARD B. NEIGHBOUR
BY
ATTORNEY Nov. 3, 1953  L. B. NEIGHBOUR  2,657,583
MANURE SPREADER DRIVE MECHANISM
Filed Aug. 23, 1951  2 Sheets-Sheet 2
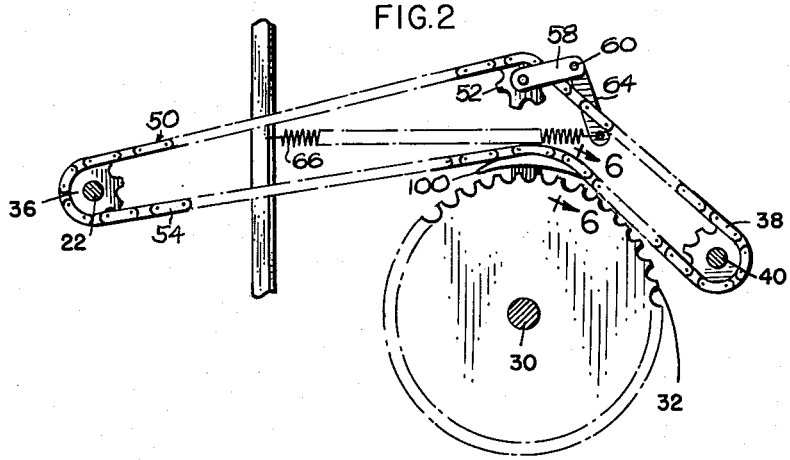
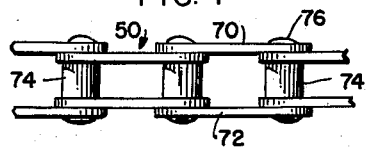
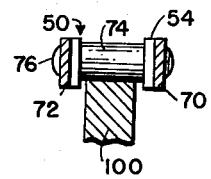
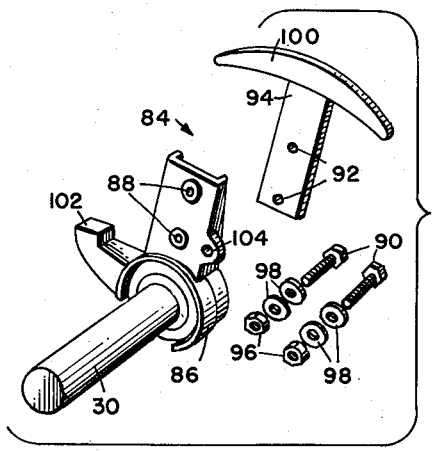
INVENTOR:
LEONARD B. NEIGHBOUR
BY
ATTORNEY Patented Nov. 3, 1953

2,657,583

UNITED STATES PATENT OFFICE 2,657,583

MANURE SPREADER DRIVE MECHANISM

Leonard B. Neighbour, Moline, Ill., assignor to Deere & Company, Moline, Ill., a corporation of Illinois Application August 23, 1951, Serial No. 243,319

10 Claims. (Cl. 74—221)

1

This invention relates to driving mechanism and more particularly to driving mechanism for a manure spreader or like machine. Still more particularly the invention pertains to that type of driving mechanism in which one run of an endless chain is moved selectively toward or away from a rotating sprocket in order to establish or disestablish drive between the sprocket and chain.

The conventional manure spreader comprises an elongated body carried on a pair of rear wheels, each of which is selectively connectible with or disconnectible from certain operating parts of the spreader. The right-hand wheel is usually connected to or disconnected from the spreading mechanism at the rear of the body, and the left-hand wheel is associated with means for feeding the load in increments rearwardly to the spreading mechanism. In a machine of this character, it is economically undesirable to utilize clutches of types that would be effective in other mechanisms. In the first place, these clutches have a substantially high initial cost and the cost of maintenance is likewise high. Because of the conditions under which the spreader operates, it is almost impossible to keep the clutches free from the material being handled. Therefore, it is expedient to use selectively engageable and disengageable mechanism that is as simple and rugged as possible in the circumstances. It is for this reason that the shiftable chain has found so much favor with designers of machines of the manure spreader type.

What is involved in the conventional disengageable or shiftable chain is simply an arrangement in which the chain is trained about a plurality of sprockets in such manner that one run thereof is adjacent the teeth of a driving sprocket. This sprocket is connectible to one of the wheels of the spreader. When the run of the chain is in engagement with the driving sprocket, the mechanism connected to the chain is, of course, driven. Disengagement of the drive is accomplished merely by lifting said run of the chain from the teeth of the driving sprocket. Heretofore, the disengagement of the chain has been accomplished by a swinging arm on which is carried a roller for engaging the chain. Although this design is satisfactory in most instances, it has certain disadvantages, such as initial cost and the necessity of using a roller of relatively large diameter to avoid sharply kinking the chain. Further, a shiftable roller of the character mentioned must be arranged for movement through a relatively wide range

2 in order to lift the run of the chain sufficiently to clear the driving sprocket.

In any mechanism of the character referred to in which the chain must be lifted from or returned to the driving sprocket, there is always the problem of maintaining the coplanar relationship of the sprocket and chain. If the lifting mechanism itself includes means for moving one of the sprockets relative to the driving sprocket, then there is presented the problem of maintaining the coplanar relationship of the shifting sprocket relative to the driving sprocket. According to the present invention, it is a feature of the invention to arrange at least the driven and one idler sprocket in such manner that these sprockets cannot be shifted transversely to the plane common to all the sprockets. Thus, the stretch or run of chain between the driven sprocket and the idler sprocket is more easily maintained in coplanar relationship to the driving sprocket as it shifts back and forth relative to the driving sprocket. Since some means must be provided for accommodating movement of the chain relative to the driving sprocket, a second idler is provided in a location remote from the driving sprocket. Thus, if there are any changes in the position of the remote run of the chain relative to the plane in which the sprockets are supposed to be coplanar, the change in position will not affect engagement and disengagement between the proximate run of the chain and the driving sprocket.

It is an object of the invention to utilize a chain lifter comprising a movable member having fixed thereto a non-rotatable element, as distinguished from the roller type heretofore used. In the present instance, the element is used in conjunction with an endless chain of the type made up of a pair of series of links articulately interconnected and including longitudinally spaced rollers transversely between the series of links. The element is of such dimension as to engage the rollers. Further, the element is elongated so that it engages several of the rollers. Primarily, the effect is one in which friction between the chain and the chain lifter is largely eliminated by utilizing the rollers already present in the chain, rather than providing an additional roller on the chain lifter.

Further objects of the invention are to provide for adjustment of the chain lifter transversely so as to maintain its alinement in a coplanar sense with the run of the chain to be lifted; to simplify the design so as to lower the initial cost; to render the design such that it may be easily maintained and operated; and to provide stop means for limiting the maximum position of the lifter when moved in such manner to lift the chain, in which respect it is a still further object to provide for shifting of the chain lifter in the direction in which the run of the chain normally moves, thereby facilitating disengagement of the chain from the driving sprocket.

The foregoing and other important objects and desirable features inherent in and encompassed by the invention will become apparent as a preferred embodiment of the invention is fully disclosed in the following detailed description and accompanying sheets of drawings in which Figure 1 is a fragmentary perspective view of a rear portion of the spreader, the rear wheel having been removed to expose the driving mechanism, and the driving chain being shown in driving position;

Figure 2 is a view similar to Figure 1 but showing the position of the chain when disengaged from the driving sprocket;

Figure 3 is a fragmentary perspective view showing the mounting of the chain lifter, other parts of the driving mechanism having been removed for the purpose of clarifying the specific illustration;

Figure 4 is a view of a portion of the roller chain utilized in the driving mechanism;

Figure 5 is a fragmentary exploded perspective view showing the components involved in the assembly of the chain lifter; and Figure 6 is a transverse sectional view, on an enlarged scale, taken on the line 6—6 of Figure 2 and showing the relationship between the chain-engaging element and the chain.

The present disclosure is based on only those parts of a spreader concerned primarily with the invention at hand. Familiarity with manure spreader construction in general will be assumed, but for purposes of amplification reference may be had to U. S. Patent 1,946,807.

That portion of the spreader shown for the purposes of the present disclosure is the rear portion including components of the beating, spreading and feeding mechanism and the drive means for the latter. The numeral 10 represents the spreader body, which is made up of right- and left-hand side walls 12 and 14 and a floor (not shown) over which moves a feeding apron for feeding material in increments to the beating and spreading mechanism. As is conventional, the feeding apron in the spreader illustrated here comprises a pair of endless chains having a plurality of cross-connected slats. The lower run of one of the chains is visible at 16 in Figure 1, as is one of the cross-connected slats, designated by the numeral 18. This apron is driven from the left-hand rear wheel (not shown) by driving mechanism not material here.

As the material reaches the rear end of the spreader, it is disintegrated or agitated by a plurality of rotary beater means, one of which comprises an upper beater carried on a transverse shaft 20 and the other of which comprises a lower beater carried on a transverse shaft 22. Radially projecting teeth of the upper beater are visible at 24 in Figure 1. The lower beater (not shown) may be of a design similar to that of the upper beater. The side walls 12 and 14 extend rearwardly to carry therebetween a transverse shaft 26 on which is carried a rotating spreading auger 28. The various rotatable parts rotate in the directions of the arrows indicated and the beaters on the shafts 20 and 22 throw the material rearwardly into the spreading auger 28 so that the material is distributed over a relatively wide area rearwardly of the spreader body 10.

The shafts 20, 22 and 26 are driven from the right-hand rear wheel (not shown) by driving mechanism to be presently described. Although the right-hand rear wheel is omitted, there is shown at 30 the right-hand end of a transverse axle on which the wheels are normally mounted. A driving sprocket 32 is journaled on the axle 30 and has at its center an overrunning clutch mechanism 34 driven by the right-hand wheel as long as the right-hand wheel is rotating in a forward direction. The type of clutch shown is of little importance here and for all practical purposes, the driving sprocket could obtain its source of power elsewhere. Details of an overrunning clutch of this character are shown in the patent referred to above.

As will be seen, the sprocket 32 is rotatable alongside the upright side wall 12 on an axis transverse or normal to that side wall. The driving sprocket is ahead of or longitudinally spaced in one direction from a driven sprocket 36 keyed to the outer end of the lower beater shaft 22. The sprockets 32 and 36 are coplanar and the mounting means for each is of such character that the sprockets are held against axial displacement or against displacement out of their coplanar relationship.

A first idler sprocket 38 is journaled on a relatively short stub shaft 40 that is in turn carried by a bracket 42 mounted on the side wall of the body ahead of the driving sprocket 32. Thus, the sprocket 38 is spaced longitudinally in the opposite direction from the driving sprocket 32, whereby the driving sprocket 32 becomes an intermediate sprocket between the first and second sprockets 36 and 38. The bracket 42 comprises a support which maintains the lateral position of the sprocket 38. That is to say, although the bracket 42 comprises a secondary part 44 generally longitudinally adjustable relative to the bracket 42 by means of slots 46 and bolts 48, the mounting is such that there can be no lateral displacement of the sprocket 38 relative to the plane in which the three sprockets 32, 36 and 38 are coplanar.

An endless flexible driving chain 50 is trained about the driven sprocket 36, the first idler sprocket 38, and about a second idler sprocket 52, this chain having a lower run or stretch 54 extending between the sprockets 36 and 38 and passing over and normally engaging the teeth at the upper portion of the periphery of the driving sprocket 32. The second idler sprocket 52 is, of course, coplanar with the other sprockets, and the chain 50 normally operates in the plane of the sprockets.

Since the positions of the sprockets 32, 36 and 38 are fixed (with the exception of the adjustment for the sprocket 38), the second idler sprocket 52 must be yieldably mounted in order to accommodate changes in the position of the chain 54 relative to the driving sprocket 52. For this purpose, the sprocket 52 is carried on a short shaft 56 at the free end of a swinging member or arm 58 pivoted on a shaft 60 that is in turn carried by a bracket 62 rigidly secured to the side wall 12 of the body 10. A second arm 64 is rigid with the arm 58 so as to form a bell crank. Biasing means in the form of a tension spring 66 is connected at one end to the arm 64 and is anchored at its other end at 68 to the body side wall 12. The spring 66 normally maintains tension in the chain 50 and permits displacement of the second idler sprocket 52 in the plane of the sprocket in response to forces tending to bring the upper and lower runs of the chain closer together than they normally operate.

The chain 50 (Figures 4 and 6) is of the type made up of a pair of transversely spaced apart series 70 and 72 of articulately interconnected links and including a plurality of rollers 74 cross-connecting the link series. The rollers 74 are, of course, freely rotatable on transverse pins 76 that interconnect the links of the link series 70 and 72. The teeth of the sprockets are received between the rollers 74 in a not unconventional manner.

As long as the lower run 54 of the chain 50 is engaged with the driving sprocket 32, drive will be imparted to the lower beater shaft 22 via the driven sprocket 36. The shaft 22 has keyed thereto a larger sprocket 78 coplanar with a sprocket 80 on the spreading auger shaft 26. A drive chain 82 is trained about the sprockets 78 and 80 for transmitting drive from the lower beater shaft 22 to the distributing or spreading auger 28. At the opposite side of the machine, a driving connection may be provided between the shaft 22 and the upper rotary beater shaft 20. Such arrangement forms no part of the present invention and is referred to briefly in lieu of an illustration merely to eliminate any doubt as to how the upper beater shaft 20 is driven.

Since it is desirable at times to disengage the drive between the driving sprocket 32 and the driven sprocket 36, it is expedient to provide means for moving the lower run 54 of the chain 50 out of engagement with the driving sprocket 32. This means must also be capable of permitting reengagement between the run 54 and the sprocket 32. Such means is shown here as a chain lifter designated generally by the numeral 84, best illustrated in Figures 3 and 5.

The means 84 includes a member 86 in the form of an arm pivoted on the spreader body so as to swing about an axis transverse to the plane of the chain and sprockets. In the present instance, the arm or member 86 is mounted on the axle 30 and therefore is concentric with the driving sprocket 32. The arm 86 is provided with a pair of bolt openings 88 for receiving a pair of bolts 90 that pass through a pair of bolt openings 92 in a secondary arm or element 94. The two arms are normally interconnected by the bolts 90 and nuts 96 are utilized to complete the assembly. A plurality of washers 98 is utilized to provide means for effecting transverse adjustment of the arm 94 relative to the arm 86, these washers being interposed in necessary numbers between the proximate faces of the arms 86 and 94. The purpose of the adjustment is to aline the arm 92 in a coplanar sense with the lower run 54 of the chain 50.

Proper alinement in the respect just noted is necessary, or at least desirable, for achieving the best possible cooperation between the lower run 54 of the chain 50 and an elongated chain-engaging element 100 rigid at the upper end of the arm 94. The element 100 is narrow so as to be received between the spaced apart link series 70 and 72 of the lower run 54 of the chain 50 (Figure 6). Thus, as the means 84 is swung from the position of Figure 1 to that of Figure 2, the elongated element 100 causes the lower run 54 of the chain 50 to be lifted from the sprocket 32, therefore disengaging the drive between the driving sprocket 32 and the driven sprocket 36. Since the rollers 74 of the chain 50 are freely rotatable respectively on their carrying pins 76, an adequate bearing relationship is established between the lower run 54 of the chain and the chain-engaging element 100, thus materially improving the efficiency of the means 84. In view of the length of the element 100, several rollers are engaged and sharp kinks in the chain are avoided, in addition to which a sufficient portion of the length of the lower run 54 is supported above the driving sprocket 32 so as to make the disengagement complete. It will be appreciated, of course, that as the means 84 lifts the lower run 54 of the chain, the second idler sprocket 52 moves downwardly against the bias of the spring 66 (Figure 2).

In order that the means 84 will not move forwardly beyond the position in which the chain run 54 is completely disengaged from the sprocket 32, stop means is provided for determining the maximum position. In the present instance, the stop means includes a lug 102 (Figures 3 and 5) rigid with the arm member 86 and engageable with an under portion of the spreader body 10.

Opposite ends of the top edge of the chain-engaging element 100 are provided as ramps to facilitate chain engagement and chain disengagement. It will be observed that the radial length of the means 84 is in excess of the radius of the driving sprocket 32. The concentric or coaxial mounting of the means 84 and the movement thereof in the direction of travel of the lower chain run 54 make the operation of the means 84 relatively simple and easy. For the purpose of controlling the means 84, the arm 86 is provided with an eye 104 within which is received the bent rear end of an operating rod 106, which rod may extend to a remote point to be under the control of an operator at the forward end of the spreader. Any other from of control could be utilized, that illustrated being merely representative of the general class and forming by itself no part of the present invention.

The disengaged position of the means 84 (Figure 1) may be determined by the length of the rod 106, which is expected to have sufficient strength in tension for that purpose. However, the compression strength of the rod 106 is under some circumstances not necessarily sufficient to warrant elimination of the stop 102.

The salient features and objects of the invention have been set forth in the foregoing description of the structure and operation of a preferred embodiment of the invention. Other features and advantages not specifically enumerated will undoubtedly occur to those versed in the art, as likewise will numerous modifications and alterations in said preferred embodiment of the invention, all of which may be achieved without departing from the spirit and scope of the invention as defined in the appended claims.

What is claimed is:

1. In a manure spreader having a longitudinal body including an upright side wall, the combination including: a driving sprocket alongside the side wall; means carrying the driving sprocket on the body for rotation about a fixed axis normal to the side wall and including provision for restraining the drive sprocket against lateral displacement relative to the side wall; a driven sprocket coplanar with and spaced to one side of the driving sprocket; means carrying the driven sprocket on the body for rotation on a fixed axis normal to the side wall and including provision for restraining the driven sprocket against displacement out of the plane of the driving sprocket; a first idler coplanar with and spaced to the other side of the driving sprocket; means carrying the first idler on the body for rotation on a fixed axis normal to the side wall and including provision for restraining the first idler against displacement out of the plane of the driving and driven sprockets; a second idler sprocket coplanar with the aforesaid sprockets and spaced from the driving sprocket intermediate the first idler sprocket and the driven sprocket; means carrying the second idler sprocket on the body for movement toward and away from and in the plane of the driving sprocket; means biasing the second idler sprocket normally away from the driving sprocket; an endless drive chain trained about the driven sprocket and the first and second idler sprockets and having a run thereof passing over and normally engaging the driving sprocket; and means movable on the body in the plane of the driving sprocket and engageable with said run of the chain intermediate the driven and first idler sprockets for moving said run from engagement with the driving sprocket.

2. In a manure spreader having a longitudinal body including an upright side wall, the combination including: a driving sprocket alongside the side wall; means carrying the driving sprocket on the body for rotation about a fixed axis normal to the side wall and including provision for restraining the drive sprocket against lateral displacement relative to the side wall; a driven sprocket coplanar with and spaced longitudinally in one direction from the driving sprocket; a fixed support carrying the driven sprocket on the body for rotation on an axis normal to the side wall and including provision for restraining the driven sprocket against displacement out of the plane of the driving sprocket; a first idler coplanar with and spaced longitudinally in the other direction from the driving sprocket; a second fixed support carrying the first idler on the body for rotation on an axis normal to the side wall and including provision for restraining the first idler against displacement out of the plane of the driving and driven sprocket; a second idler sprocket coplanar with the aforesaid sprockets and spaced vertically from the driving sprocket located intermediate the first idler sprocket and the driven sprocket; arm means carrying the second idler sprocket at one end and having its other end pivoted on the body for swinging movement to carry the second idler sprocket toward and away from and in the plane of the driving sprocket; means biasing the arm means to urge the second idler sprocket normally away from the driving sprocket; an endless drive chain trained about the driven sprocket and the first and second idler sprockets and having a run thereof passing over and normally engaging the driving sprocket; and means movable on the body in the plane of the driving sprocket and engageable with said run of the chain intermediate the driven and first idler sprockets for moving said run from engagement with the driving sprocket.

3. Disengageable driving mechanism for a manure spreader, comprising: a plurality of coplanar sprockets rotatable respectively on parallel axes and including first and second widely spaced apart sprockets and an intermediate sprocket between the first and second sprockets; an endless driving chain having a run engaging each of and extending between the first and second sprockets and arranged to be moved in the plane of the sprockets selectively toward or away from the intermediate sprocket for selective engagement with or disengagement from the intermediate sprocket; said chain being of the type comprising two series of articulately interconnected links lying side by side and spaced transversely of the plane of the sprocket with a plurality of rollers cross-connecting said series; and means engageable with the run of the chain in proximity to the intermediate sprocket for moving said run away from and out of engagement with the driving sprocket, said means comprising a member movable selectively between an idle position free of said run and an operating position engaging said run respectively away from or toward said run, said member having fixed thereon and non-rotatable relative thereto an element of such transverse dimension as to be receivable between the series of links of the chain to engage the rollers of the chain.

4. The invention defined in claim 3, further characterized in that: said sprockets are normally arranged for rotation such that the direction of travel of said run of the chain is from the first sprocket to the second sprocket; and the member is mounted for movement so that in its idle position it is between the first and intermediate sprockets and is movable to its operating position in the aforesaid direction of travel of said run.

5. The invention defined in claim 3, further characterized in that: stop means is provided for preventing movement of the member beyond its chain-disengaging position.

6. The invention defined in claim 3, further characterized in that: said member comprises an arm pivoted concentrically with the intermediate sprocket and longer than the radius of the intermediate sprocket so that the free end of the arm is beyond the periphery of the intermediate sprocket; and said non-rotatable element is a guide elongated in the direction of said run so as to engage a plurality of rollers of the chain.

7. The invention defined in claim 6, further characterized in that: said sprockets are arranged such that the direction of travel of said run is from the first sprocket to the second sprocket; and said arm is pivoted so that in its idle position the guide is between the first and intermediate sprockets and is swingable in said direction to its operating position.

8. The invention defined in claim 3, further characterized in that: said element is elongated in the direction of said run so as to engage a plurality of rollers of the chain.

9. The invention defined in claim 8, further characterized in that: said element has ramp portions respectively at opposite ends to facilitate engagement with and disengagement from said run.

10. The invention defined in claim 3, further characterized in that: said member and element are separate components; and means is provided for securing the two together, said means including provision for adjustment of the element laterally relative to the member to aline the element in a coplanar sense with said run of the chain.

LEONARD B. NEIGHBOUR.

References Cited in the file of this patent

UNITED STATES PATENTS

| Number | Name | Date |
|---|---|---|
| 1,946,807 | Neighbour | Feb. 13, 1934 |
| 2,342,837 | Brown | Feb. 29, 1944 |
| 2,427,880 | Schmied | Sept. 23, 1947 |